Aug. 21, 1951     A. L. ESSMAN     2,564,781
RAILWAY SIGNAL CONTROL SYSTEMS
Filed Aug. 19, 1947
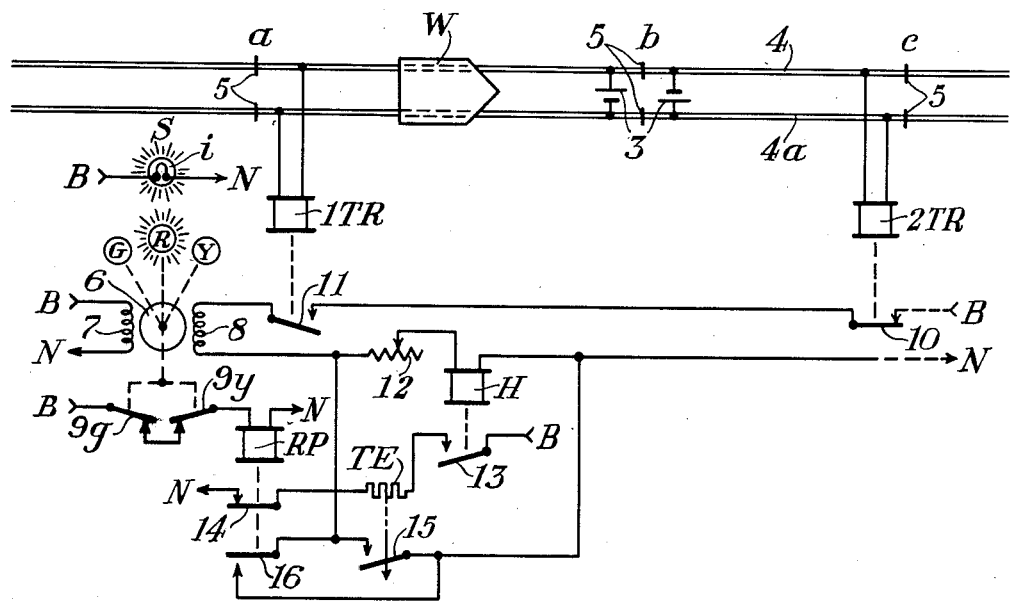
INVENTOR.
Arthur L. Essman
BY
HIS ATTORNEY Patented Aug. 21, 1951

2,564,781

UNITED STATES PATENT OFFICE 2,564,781

RAILWAY SIGNAL CONTROL SYSTEM

Arthur L. Essman, Downers Grove, Ill., assignor to The Union Switch and Signal Company, Swissvale, Pa., a corporation of Pennsylvania Application August 19, 1947, Serial No. 769,383

6 Claims. (Cl. 246—41)

My invention relates to a railway signal control system, and particularly to a control system which includes one or more track relays for controlling a quick acting signal.

If a signal which has a quick acting operating element is controlled by a track relay, and if the track relay is deenergized because its track circuit is shunted by a train, a brief energization of the track relay, such as due to a momentary loss of shunt of its track circuit, may cause the signal momentarily to display a false proceed indication when it should continue to indicate stop.

One feature of my invention is the provision of a time element arrangement for delaying operation of a signal for a measured period of time after a track relay, by which the signal is controlled, becomes energized. In this way, a signal is prevented from momentarily displaying a false proceed indication in the event of a momentary loss of shunt of a track relay by which it is controlled, or in the event of a short train moving rapidly from one track section onto another track section, so that the track relay, for the section which the train is leaving, closes its contacts before the front contacts of the track relay, for the section which the train is entering, become opened.

I shall describe one form of apparatus embodying my invention, and shall then point out the novel features thereof in claims.

The accompanying drawing is a diagrammatic view showing one form of apparatus embodying my invention, in which a signal having a quick acting operating element such, for example as a searchlight signal, is controlled by a circuit which includes front contacts of two track relays, and in which a time element arrangement controlled by the signal control circuit prevents operation of the signal for a measured period of time after a track relay contact closes the signal control circuit.

Similar reference characters refer to similar parts in the drawing.

Referring to the drawing, a stretch of railway track is shown having rails 4 and 4a divided by insulated joints 5 to form sections a—b and b—c. Each of these sections is provided with a track circuit including a suitable source of current, such for example as a battery 3, connected across the rails adjacent one end of the section. The track circuit for each of the sections a—b and b—c also includes a track relay 1TR or 2TR, respectively, connected across the rails adjacent the opposite end of the section.

A signal, designated by the reference character S, is shown adjacent the end a of section a—b, for governing traffic movements toward the right, as shown in the drawing, which I shall assume is the eastbound direction, over sections a—b and b—c. Signal S may be of any suitable design, such, for example, as the well-known searchlight type, as shown in the drawing. Signal S, as shown, comprises a member 6 mounted to oscillate and controlled by two windings 7 and 8. The member 6 carries three roundels G, R and Y arranged to cooperate with an electric lamp $i$ in such manner that when the member 6 is in its middle position, to which it is biased, roundel R is in front of lamp $i$, whereas when the member 6 is swung to the left or to the right, roundel Y or roundel G is placed in front of the lamp $i$. As shown in the drawing, the lamp $i$ is above the roundels, but the lamp is placed in this location for purposes of illustration, and in actual practice, it is to be understood that the lamp is located directly behind the roundels.

Signal S displays a proceed indication when its roundel G or Y is in front of lamp $i$, and displays a stop indication when roundel R is in front of lamp $i$. The proceed indication which is displayed when roundel G is in front of lamp $i$ is known as a clear indication, and the proceed indication which is displayed when roundel Y is in front of lamp $i$ is known as an approach indication. Lamp $i$ is constantly lighted from a suitable source of current having terminals B and N.

Operatively connected with the member 6, are two contacts 9g and 9y which are operated in such manner that, when the signal is in its stop position, both contacts are closed. When the signal is in its approach position, contact 9g is closed, but contact 9y is open, whereas when the signal is in its clear position, contact 9g is open and contact 9y is closed.

A signal of the type just described is disclosed and claimed in Reissue Letters Patent of the United States No. 14,940, granted to Eli J. Blake on August 31, 1920.

A repeater relay, designated by the reference character RP, is controlled by contacts 9g and 9y of signal S.

Signal S is controlled to display one of its proceed indications by a circuit which includes front contacts of track relays 1TR and 2TR. Selection between the clear and approach indications may be provided by any suitable means, not shown in the drawing, but indicated by the dash line portion of the circuit adjacent the right-hand end of the drawing.

When the control circuit for signal S, including the control winding or operating element 8, becomes closed by a front contact of one of the track relays 1TR and 2TR, a signal relay H and a resistor 12 are connected in series with winding 8. The various parts of this circuit are so proportioned that relay H will be operated to close its front contact, but signal S will not be operated, and will therefore continue to indicate stop.

A time element device, designated by the reference character TE, which may be of any suitable design such, for example as the well-known thermal type, is controlled by front contacts of relays H and RP. Upon the lapse of a measured period of time after relay H closes its front contact, time element device TE will close its front contact in multiple with resistor 12 and relay H, thereby permitting sufficient current to flow to operate signal S.

When signal S becomes operated away from its stop position, one of the contacts, 9g or 9y, becomes opened, thereby deenergizing relay RP. Relay RP, upon becoming deenergized, closes its back contact in multiple with resistor 12 and relay H, thereby retaining signal S in its operated position.

Having described, in general, the arrangement of the various parts of apparatus embodying my invention, I shall now describe the circuits and operation in detail.

As shown in the drawing, a train W is occupying section a—b, and therefore relay 1TR is deenergized. Section b—c is unoccupied, and therefore relay 2TR is energized. With contact 11 of relay 1TR open in the control circuit for signal S, operating element 8 is deenergized, and therefore signal S is indicating stop. Also, with contact 11 of relay 1TR open, relay H is deenergized, and therefore time element device TE is also deenergized. With signal S indicating stop, relay RP is energized. The circuit, by which relay RP is energized, passes from terminal B, through contacts 9g and 9y of signal S, and the winding of relay RP to terminal N.

I shall assume that, with apparatus arranged as shown in the drawing, and with train W on section a—b, relay 1TR becomes energized for a brief period of time because of momentary loss of shunt of the track circuit for section a—b. The signal control circuit will therefore be completed, passing from terminal B, through signal indication selection apparatus not shown in the drawing, contact 10 of relay 2TR, contact 11 of relay 1TR, operating element 8 of signal S, resistor 12, and the winding of relay H, back to terminal N.

Relay H becomes operated by this circuit, but signal S is not operated, because resistor 12 and relay H prevent the passage of sufficient current for operating signal S. Relay H, upon becoming energized, closes its contact 13, thereby completing a circuit for energizing time element device TE, this circuit passing from terminal B, through contact 13 of relay H, time element device TE, and contact 14 of relay RP to terminal N. With only a momentary loss of shunt, relay 1TR will again become deenergized before time element device TE closes its contact 15, and therefore signal S will continue to indicate stop.

I shall next assume that train W is short, and that it moves rapidly from section a—b onto section b—c, so that contact 11 of relay 1TR becomes closed before contact 10 of relay 2TR opens, and therefore the circuit previously traced for energizing relay H in series with operating element 8 of signal S is again closed for a brief period of time. Relay H therefore again closes the circuit for energizing time element device TE. Before time element device TE closes its contact 15, contact 10 of relay 2TR opens, and therefore signal S again continues to indicate stop.

When the train leaves section b—c, the circuit traced through operating element 8 of signal S and the winding of relay H again becomes closed, and relay H again closes the circuit for energizing time element device TE. Upon the lapse of a measured period of time, contact 15 of time element device TE becomes closed in multiple with resistor 12 and relay H, so that now sufficient current flows through winding 8 of signal S for operating signal S to one of its proceed positions.

Signal S upon being operated away from its stop position, opens one of its contacts 9g and 9y, thereby deenergizing relay RP. Contact 16 of relay RP then becomes closed in multiple with contact 15 of time element device TE, thereby permitting sufficient current to continue to pass through operating element 8 of signal S for retaining signal S in one of its proceed positions.

When relay H becomes deenergized on account of being shunted by contact 15 of time element device TE, its contact 13 opens the circuit for time element device TE, but since contact 15 of time element device TE is slow in releasing, contact 16 of relay RP closes before contact 15 opens.

Although I have herein shown and described onlly one form of apparatus embodying my invention, it is understood that various changes and modifications may be made therein within the scope of the appended claims without departing from the spirit and scope of my invention.

Having thus described my invention, what I claim is:

1. In a control system for a railway signal for a stretch of railway track which is provided with a track circuit including a track relay, the combination comprising, a control element for said signal, a signal relay, a control circuit for said signal controlled by said track relay and including a source of current for energizing said control element and said signal relay in series for operating said signal relay but not said signal, a repeater relay energized if said signal is controlled to indicate stop, a time element device, a control circuit for said time element device controlled by front contacts of said signal relay and said repeater relay, and a front contact of said time element device connected in multiple with a back contact of said repeater relay and with the control winding of said signal relay for effecting operation of said signal and for then retaining said signal in its operative condition.

2. In a control system for a railway signal for a stretch of railway track which is provided with a track circuit including a track relay, the combination comprising, a signal relay, a control circuit for said signal controlled by said track relay and energized by current of sufficient magnitude for operating said signal relay but not of sufficient magnitude to operate said signal, a time element device, a circuit controlled by a front contact of said signal relay for energizing said time element device, and a front contact of said time element device connected in multiple with the control winding of said signal relay for effecting operation of said signal.

3. In combination, a railway signal having an operating element, a control contact for said signal, means for closing said contact, a signal relay, a circuit including said contact and said operating element and also said signal relay all in series and proportioned to operate said signal relay but not said signal, and means controlled by said signal relay for connecting a branch path around said signal relay in said circuit for effecting operation of said signal upon the lapse of a measured period of time after said contact becomes closed.

4. In combination, an electrical device having an operating element, a control contact for said device, means for closing said contact, a control relay, a circuit including said contact and said operating element and also said control relay all in series and proportioned to operate said control relay but not said electrical device, a second contact controlled to be closed if said device is in its inoperative condition, a third contact controlled to be closed if said device is in its operative condition, a time element device controlled by a front contact of said control relay and by said second contact, and a front contact of said time element device connected in multiple with said third contact and with said control relay for effecting operation of said electrical device and for then retaining said electrical device in its operative condition.

5. In combination, an electrical device, a control relay, a circuit including said control relay in series with said electrical device and energized by current to which said control relay responds but which is ineffective to operate said electrical device, and means controlled by said control relay for connecting a branch path around said control relay in said circuit for effecting operation of said electrical device upon the lapse of a measured period of time after said control relay becomes energized and for then retaining said electrical device in its operative condition.

6. In combination, an electrical device, a control relay, a circuit including said control relay in series with said electrical device and energized by current to which said control relay responds but which is ineffective to operate said electrical device, time element means controlled by said control relay for connecting a branch path around said control relay in said circuit for effecting operation of said electrical device upon the lapse of a measured period of time after said control relay becomes energized, and means controlled by said electrical device for then retaining said electrical device in its operative condition.

ARTHUR L. ESSMAN.

REFERENCES CITED

The following references are of record in the file of this patent:

UNITED STATES PATENTS

| Number | Name | Date |
|---|---|---|
| 1,790,526 | Young | Jan. 27, 1931 |
| 1,806,796 | Gates | May 26, 1931 |
| 2,103,277 | Schmidinger | Dec. 28, 1937 |